Nov. 15, 1966     K. A. DOUTT     3,285,616
CUSHION SEAL FOR PISTON AND CYLINDER ASSEMBLIES
Filed April 14, 1964
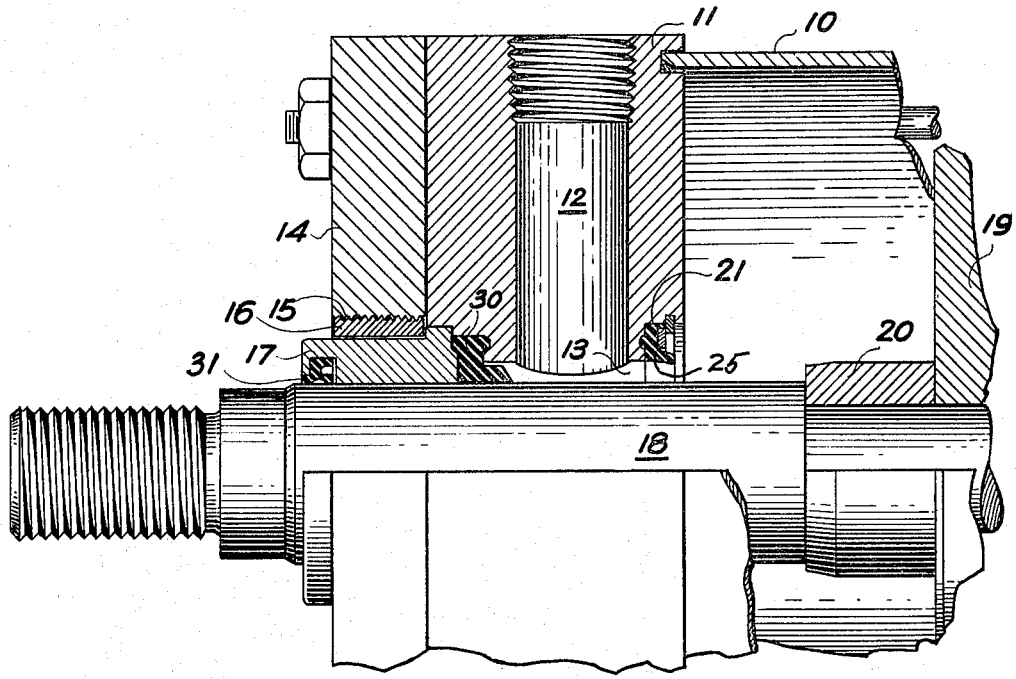
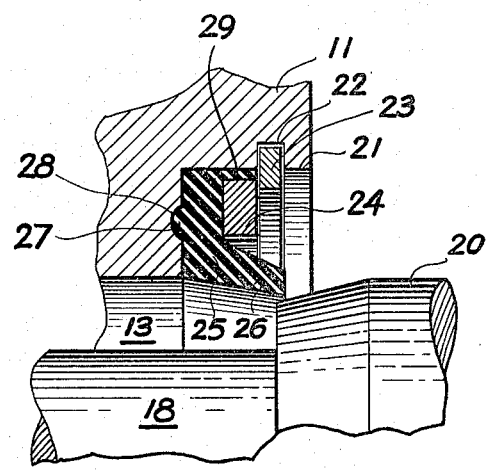
INVENTOR.
Kingsley A. Doutt
BY
ATTORNEY.

United States Patent Office 3,285,616
Patented Nov. 15, 1966

3,285,616
CUSHION SEAL FOR PISTON AND CYLINDER
ASSEMBLIES
Kingsley A. Doutt, 115 Maple St., Alpena, Mich.
Filed Apr. 14, 1964, Ser. No. 359,677
1 Claim. (Cl. 277—181)

This invention relates generally to a hydraulic piston and cylinder assembly and more particularly to a cushion seal positioned in a cylinder head of said piston and cylinder assembly and arranged to engage an enlarged annular area on the piston rod so as to provide a cushioning action as will be understood by those skilled in the art.

The principal object of the invention is the provision of a cushion seal for a hydraulic piston and cylinder assembly that will effectively function under adverse fluid pressure conditions and remain in desired operative position in said assembly.

A further object of the invention is the provision of a cushion seal for a hydraulic piston and cylinder assembly and wherein the cushion seal comprises an annular member formed of flexible rubber-like material and incorporating means for holding said annular member in annular shape.

A further object of the invention is the provision of a cushion seal for a hydraulic piston and cylinder assembly arranged to be positioned in such piston and cylinder assembly in a manner preventing it from being accidentally disengaged therefrom so as to become in operative.

A still further object of the invention is the provision of a cushion seal for a piston and cylinder assembly of a configuration and construction such that hydraulic pressure engaged thereagainst and tending to distort the same will hold the cushion seal in desirable operating shape and location.

The cushion seal disclosed herein in a hydraulic piston and cylinder assembly comprises an improvement in the art relating to such seals. In hydraulic piston and cylinder assemblies, it is customary to arrange the construction of the piston rod and piston so that an enlargement on the piston rod enters the fluid passageway at a point in advance of the actual piston travel relative thereto so as to close the fluid passageway with a valving action which effectively cushions the piston action as the travel thereof is slowed down and progressively stopped thereby. In the past, the cushioning action has largely depended on the relative sizes of the fluid passageway and the annular member on the piston rod engaging the same, and it has become customary on the art to supply some type of cushion seal taking the form of an annular gasket positioned about the fluid passageway and against which annular gasket the enlarged area on the piston rod is operatively engaged when the above-described cushioning action occurs.

It will occur to those skilled in the art that the hydraulic fluid in the cylinder, and being moved outwardly thereof by the action of the piston, must therefor flow in restricted degree, if at all, between the cushion seal and the annular enlarged area on the piston rod and that under such circumstances it has been common for the fluid pressure to bodily remove the annular cushion seal or gasket from its desired location and force it into the fluid passageway.

Since the preferred construction requires the cushion seal to be effective on rapid traverse action of the piston relative to the end wall of the cylinder in which the cushion seal is located, it is desirable that the cushion seal remain in fixed operative position, and more importantly, in operative shape so that it can perform its function efficiently.

These several objects are accomplished by the improvement in cushion seals disclosed herein.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a cross sectional side elevation of a portion of a piston and cylinder assembly showing the cushion seal in position therein.

FIGURE 2 is an enlarged detail of the cushion seal assembly seen in FIGURE 1.

By referring to the drawings and FIGURE 1 in particular, it will be seen that a cylinder 10 is positioned in engagement with a cylinder head 11 which in turn has a fluid passageway 12 therein in communication with a central fluid passageway 13 which in turn communicates with the interior of the cylinder 10. A clamp head 14 is positioned adjacent the cylinder head 11 and has a central threaded opening 15 therein which threadably receives a threaded ring member 16 which in turn surrounds a gland 17 which is positioned directly on a piston rod 18 which extends through the fluid passageway 13 heretofore described and outwardly of the clamp head 14 as will be understood by those skilled in the art.

A piston 19 is secured to the piston rod 18 and positioned within the cylinder 10 and an annular enlarged cushion valve element 20 is positioned on the piston rod 18 adjacent the piston 19 and located by reason of an offset formed in the piston rod 18. An annular recess 21 is formed in the inner wall of the cylinder head 11 around the central fluid passageway 13 therein and a cushion seal is located in the annular recess 21 and is best illustrated in enlarged detail in FIGURE 2 of the drawings.

By referring to FIGURE 2 of the drawings, is will be seen that an angular groove 22 is formed in the cylinder head 11 with respect to the annular recess 21 therein and an annular snap ring 23 is shown positioned partly in the groove 22 and partly within the area defined by the annular recess 21 so as to securely position a cushion seal assembly in the recess 21. The cushion seal assembly comprises an annular rigid member 24 to which there is secured as by vulcanization a flexible rubber-like cushion seal member 25. The cushion seal member 25, while annular in shape, is of cross section including an elongated annular flange portion 26 which is tapered from a thicker portion adjacent the main body of the cushion seal member 25 and toward a smaller outer end portion defining the outer annular edge of the flange 26.

The cushion seal member 25 and its annular tapered flange 26 are so formed that they normally assume an angular relation to one another, the angle being acute as shown in the enlarged detail of FIGURE 2 of the drawings so that a small annual contact area extending into the fluid passageway 13 is defined by the cushion seal for initial engagement with the tapered end portion of the enlarged portion 20 on the piston rod 18, heretofore referred to, which acts as a cushioning valve. The cushion seal member 25 has an annular rib 27 which in turn engages an annular group 28 formed in the cylinder head 11 and in oppositely disposed relation to the inner surface thereof which defines an end wall of the chamber within the cylinder 10.

The cushion seal member 25 also includes a secondary annular flange 29 which is spaced radially with respect to the flange 26 and is relatively thin compared therewith and which overlies the peripheral edge of the annular rigid member 24. The inner surface of the secondary annular flange 29 and the adjacent surface of the cushion seal body member 25 are vulcanized, or otherwise secured to the annular rigid member 24 so that the rigid and flexible members form a unitary cushion seal held in place by the snap ring 23 and the annular rib 27 and capable of controlling fluid pressure while retaining its desired shape and positioning in the piston and cylinder assembly.

By referring again to FIGURE 1 of the drawings, it will be observed that there is a rod seal 30 positioned in an annular recess in the opposite side of the cylinder head 11 and in abutting relation to the inner end of the gland 17 and that there is a wiper seal 31 positioned in the gland 17 in accordance with the usual practice.

It will thus be seen that an improved cushion seal has been disclosed in connection with a hydraulic piston and cylinder assembly and which improved piston seal meets the several objects of the invention, and having thus described by invention, what I claim is:

In combination, a piston and cylinder assembly including a cylinder head having an annular recess, a piston rod, an enlarged portion on said piston rod, said enlarged portion having a tapered end portion, a cushion seal therefor positioned in said annular recess, said cushion seal comprising a flexible annular homogenous body member substantially rectangular in cross section, an annular recess in the front face thereof; an annular rigid member rectangular in cross section secured in position in said recess, the front face of said rigid member being planar and in the plane of the front face of the outer peripheral portion of said flexible annular body, an annular groove in the wall of said annular recess, a snap key ring positioned in said groove and contacting the outer front face of said rigid member and annular body and holding them in place, the inner annular portion of said flexible body projecting forwardly beyond the said plane in the form of an outwardly tapering annular lip for initial sealing engagement with the said tapered end portion of said enlarged portion on said piston rod.

References Cited by the Examiner
UNITED STATES PATENTS

| | | | |
|---|---|---|---|
| 2,183,004 | 12/1939 | Boyd | 277—184 |
| 2,489,769 | 11/1949 | Flick | 277—212X |
| 2,631,906 | 3/1953 | Brock | 277—205X |
| 2,897,785 | 8/1959 | Ortman | 277—35X |

FOREIGN PATENTS

| | | |
|---|---|---|
| 807,205 | 1/1959 | Great Britain. |

LAVERNE D. GEIGER, *Primary Examiner.*

J. MEDNICK, *Examiner.*